United States Patent [19]

Fitch

[11] 4,274,958
[45] Jun. 23, 1981

[54] FLOCCULANT DISTRIBUTOR MEANS FOR FEEDWELL

[75] Inventor: Elliot B. Fitch, Auburn, Ala.

[73] Assignee: Dorr-Oliver Incorporated, Stamford, Conn.

[21] Appl. No.: 122,309

[22] Filed: Feb. 19, 1980

Related U.S. Application Data

[63] Continuation of Ser. No. 949,485, Oct. 10, 1978, abandoned.

[51] Int. Cl.³ ............................................. B01D 21/16
[52] U.S. Cl. .................................... 210/208; 210/220; 210/519
[58] Field of Search ................................ 210/205–208, 210/220, 304, 519, 523, 83, 84; 366/165, 177

[56] References Cited

U.S. PATENT DOCUMENTS

| | | | |
|---|---|---|---|
| 1,702,256 | 2/1929 | Green | 210/207 |
| 2,267,412 | 12/1941 | Merwin | 366/165 X |
| 2,528,094 | 10/1950 | Walker | 210/207 X |
| 2,969,225 | 1/1961 | Jenks | 210/304 X |
| 3,006,474 | 10/1961 | Fitch | 210/304 X |
| 3,261,593 | 7/1966 | Sharples | 366/165 |
| 3,532,218 | 10/1970 | Von Blottnitz et al. | 210/207 |
| 4,054,514 | 10/1977 | Ohmann | 210/208 X |

FOREIGN PATENT DOCUMENTS 857856  1/1961  United Kingdom ...................... 210/84

Primary Examiner—Robert H. Spitzer
Attorney, Agent, or Firm—Burtsell J. Kearns; Harold M. Snyder

[57] ABSTRACT

A sedimentation tank having a central feedwell comprising upper and lower cylindrical channels or raceways for receiving the influent feed in split counter rotative streams wherein an intermediate raceway is provided between the upper and lower channels for receiving a flocculant for mixing with the influent feed in the shear zone where the split streams remerge.

3 Claims, 3 Drawing Figures

FLOCCULANT DISTRIBUTOR MEANS FOR FEEDWELL

This is a continuation of application Ser. No. 949,485, filed Oct. 10, 1978, now abandoned.

BACKGROUND OF THE INVENTION

The present invention is directed to sedimentation apparatus and more particularly to apparatus for clarification of liquids by separation of a solids from a liquid solids suspension wherein flocculants are added to the suspension for increasing the rate of separation and providing a dense underflow.

In certain sedimentation apparatus which comprise cylindrical settling tanks which utilize central feedwells for receiving a solids contained liquid suspension for settling the solids within the tank, it is well known to utilize the addition of flocculating chemicals to the influent either in the feedwell or at a point prior thereto to promote the agglomeration of solids and rapid settling thereof within the tank. The settled solids form a dense underflow and are removed from the bottom of the tank by means of rotating rake means which direct the settled mass to a central discharge sump in the tank. Simultaneously the clarified liquid overflows the top of the tank into a peripheral launder. Various means are utilized for introducing the settling solids from the feedwell either directly into the dense underflow bed or into a settling zone above the bed and for controlling the amount of flocculant dosage in accordance with a selected desired rate of settling.

In flocculation treatment utilizing equipment of the aforementioned type where the treatment of the influent is effected within the confines of the feedwell it is important that the flocculant be added to the influent in such a manner so as to obtain maximum distribution of the flocculant throughout the feedwell to form flocs in a rapid manner for settlement in the feedwell without further disturbing effects. It is therefore essential that a rapid and efficient mixing of flocculant with the influent feed be effected.

In the past various means have been employed for accomplishing these desired results by locating a flocculant feed means within a feedwell. For example in the apparatus disclosed in U.S. Pat. No. 3,532,218 a sparger ring is located about the upper periphery of a deep feedwell and which sparger is provided with orifices for introducing a flocculant into the feedwell for mixture with the influent feed. In U.S. Pat. No. 4,054,514 an auxiliary mixing tank is located within the main feedwell and is provided with an agitating device for mixing and dispersing flocculant treated feed suspension as an overflow from the auxiliary tank into a main feedwell. On the other hand U.S. Pat. No. 2,528,094 discloses an arrangement wherein a flocculant is introduced into a tank to mix with the influent with a series of baffles provided to mix the flocculant with the influent feed.

The aforementioned prior art devices have met with varying success and do not exhaust the various prior art means for mixing flocculant either in or exterior to a feedwell but illustrate generally the prior art attempts to provide such means. Various problems are encountered in known devices in effectively and efficiently accomplishing the rapid settlement of solids. In one known type feedwell structures as disclosed in U.S. Pat. No. 3,006,474 a feedwell is disclosed which comprises a feed distributor unit comprising circular channels or raceways juxtaposed one upon the other within a cylindrical feedwell. The main influent feed stream is split into two separate streams which are fed into the channels tangentially with one stream rotating counterclockwise and the other clockwise. The streams are displaced inwardly in opposite directions from the channels and are compelled to shear in a plane along the entire length of the channel at twice the velocity of either stream. The kinetic energy of the stream is thereby converted to a random turbulence of small eddies resulting in the elimination of any residual tangential velocity components to effectively dissipate the energy of the influent feed. This type feedwell has met with widespread acceptance and in view of the lack of moving parts is an economical and effective device.

It is an object of the present invention to provide a sedimentation device wherein novel means are included for introducing and mixing flocculant chemicals with an influent solids containing feed stream whereby the latter are mixed rapidly and thoroughly.

Another object is to provide for a novel flocculant distributor means for promoting a rapid agglomeration of settling solids within a feedwell resulting in dense underflow and a clarified overflow.

A still further object is to provide novel means for introducing flocculant in a feedwell for effective and rapid separation of solids from a liquid suspension without the use of complex structure or moving parts.

SUMMARY OF THE INVENTION

The present invention contemplates a novel means for distributing flocculant to an influent feed within a feedwell of a sedimentation apparatus such as a clarifier or thickener tank. In one embodiment the tank comprises a cylindrical structure having a central cylindrical feedwell and rotary rake structure for moving a dense underflow to a central discharge point in the bottom of the tank. The feedwell extends and discharges into the lower region of the tank. A submerged inlet feed structure comprising a pair of superimposed cylindrical channels or raceways for receiving influent feed in opposite rotative paths is arranged within the feedwell. An intermediate channel is provided between the superimposed channels for receiving flocculant for mixture with the merging feed within the shear zone as the split streams are directed inwardly about the raceways to remerge as they discharge into the feedwell.

The above and other objects of the present invention will appear more fully hereinafter from a consideration of the detailed description which follows taken together with the accompanying drawings wherein one embodiment is illustrated.

DETAILED DESCRIPTION

Figure 1:
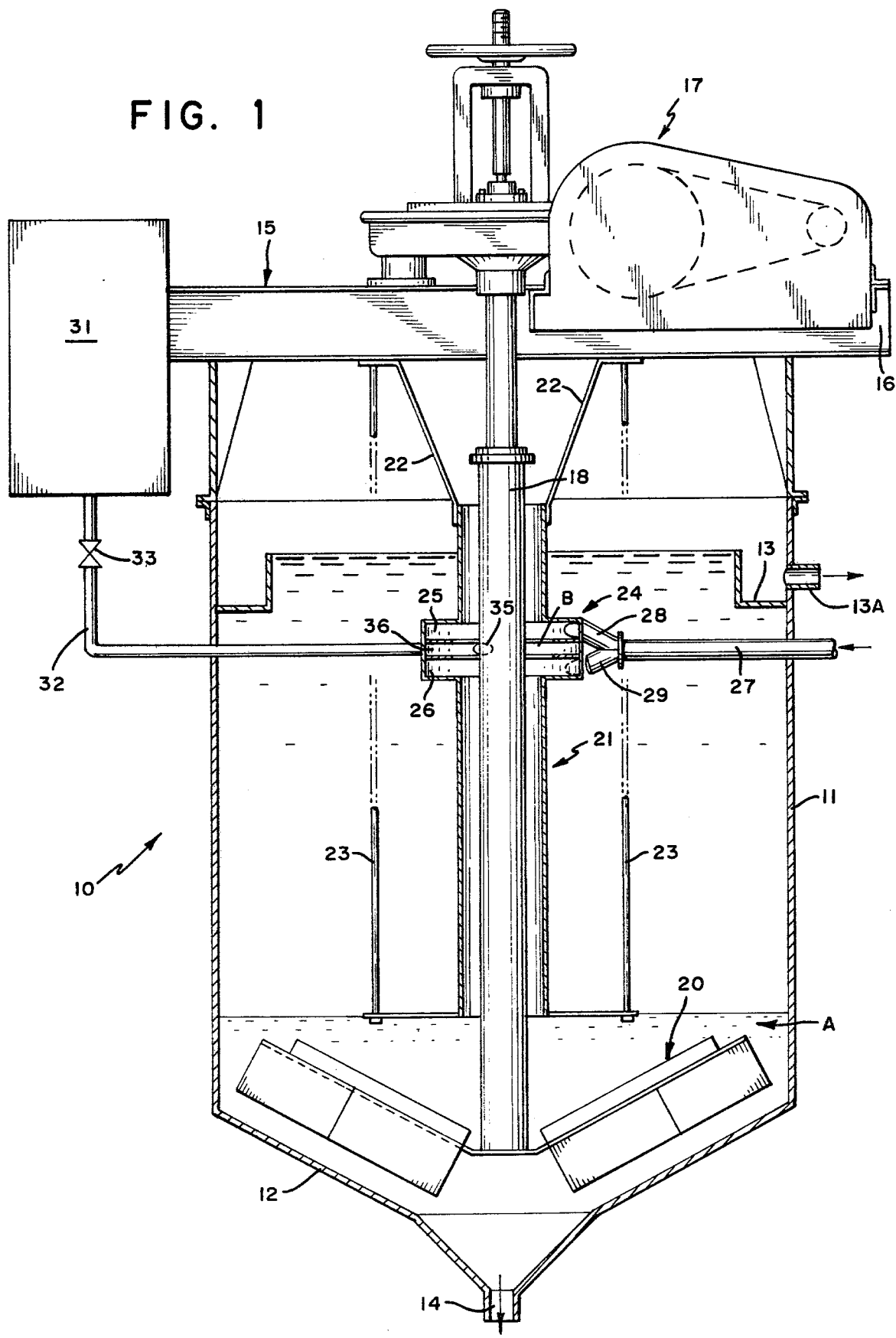
FIG. 1 is a sectional elevational view of a sedimentation tank embodying the novel flocculation feedwell structure.

Referring now to the drawings for a more detailed description of the present invention a sedimentation tank incorporating an embodiment thereof is schematically illustrated and generally indicated by the reference numeral 10 in FIG. 1. Tank 10 comprises a cylindrical outer wall 11, a conical bottom wall 12 and an overflow peripheral launder 13 and outlet 13A, as well as a central sludge discharge sump outlet 14. An overhead supporting structure 15 is mounted on tank wall 11 and includes a beam 16 which supports a motor drive mechanism 17 for driving a central rotatable drive shaft 18 to which is mounted a rotary rake structure 20 for moving settled underflow to sump 14 in a known manner.

Figure 2:
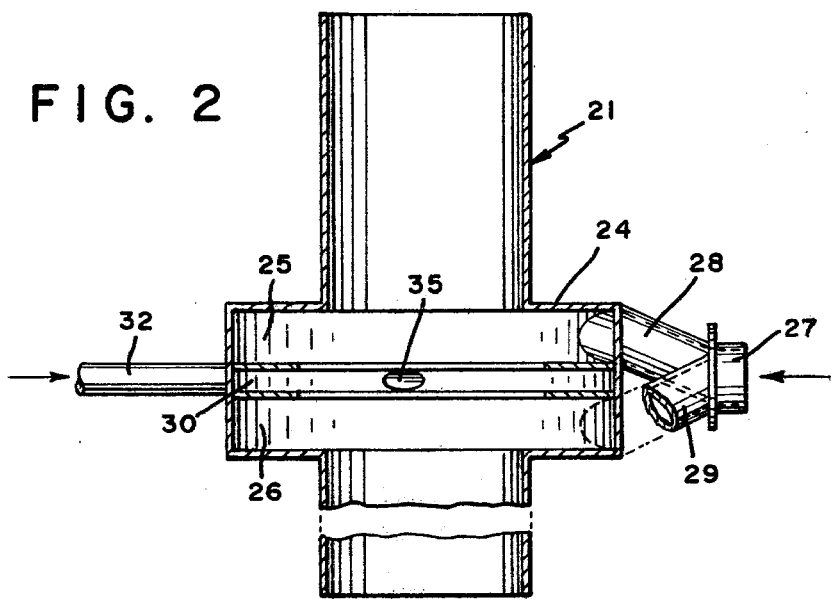
FIG. 2 is an enlarged elevational view of the feedwell removed from the tank.
Figure 3:
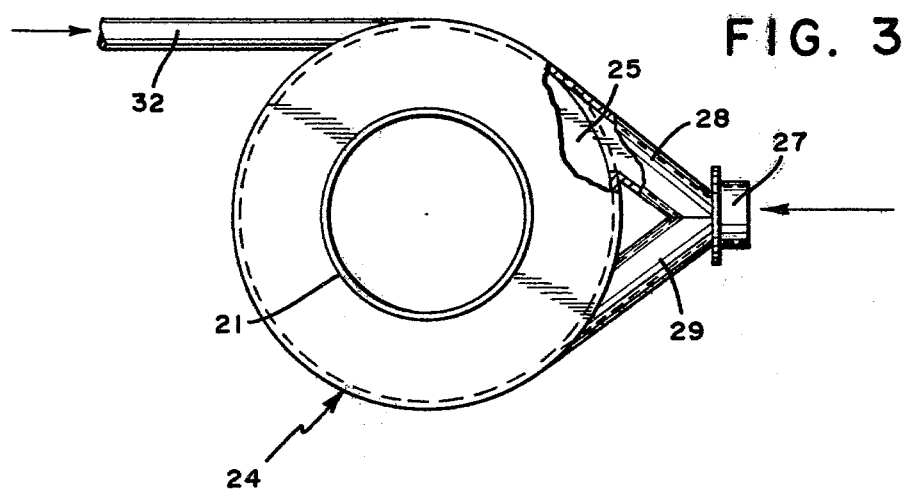
FIG. 3 is a sectional view taken on the line 3—3 of FIG. 2 with parts of the feedwell broken away to show the interior structure thereof.

A central feedwell structure 21 depends from supporting beam 16 by means of flanged members 22 and tie rods 23 connected to beam 16. Feedwell 21 comprises an elongated hollow cylindrical column about drive shaft 18. Feedwell 21 is open to the lower region of tank 10 for discharging solids into or above the sludge or settled solids bed A. A submerged influent feed arrangement 24 is provided within feedwell 21 and comprises upper and lower circular feed channels 25 and 26 which are open to the longitudinal axis of feedwell 21 and are adapted to receive an influent feed from a feed conduit 27. Feed conduit 27 splits into upper and lower branches 28 and 29 leading tangentially into upper and lower feed channels 25 and 26. In this manner the liquid influent is caused to flow inwardly in opposite directions from channels 25 and 26 to shear in a plane along the entire length of the channels at twice the velocity of either shear in a shear zone designated "B" (FIG. 2) in accordance with the teaching of the aforementioned patent U.S. Pat. No. 3,006,474 to Fitch entitled "Method and Means for Converting the Kinetic Energy of a Fluid Stream into Random Turbulence". In the shear zone B the energy of the two streams is converted into random turbulence and the energy of the influent stream dissipated.

As mentioned it is a feature of this invention to provide novel means for distributing and mixing flocculant with the influent feed for rapid settling of solids within the feedwell column 21. To this end an intermediate channel or tray 30 is provided in feedwell section 24 for receiving the flocculants from a flocculant mixing tank 31. Flocculant mixing tank 31 is mounted on overhead structure 15 and includes a feed pipe 32 and control valve 33. Pipe 32 extends into tank 10 and has an opening 35 in raceway 30 for tangentially introducing flocculant to the merging streams of the split influent feed in the shear zone B from channels 25 and 26 to effect a rapid settling of flocs in zone B and agglomeration of solids to form a dense underflow for discharge through sump outlet 14.

In a comparison test of a feedwell of the type disclosed, flocculant was added to an influent feed of uranium acid leach suspension prior to the feedwell and externally of the tank at a dosage rate of 0.05 lb./ton resulting in a thickener operating at a unit area capacity of 0.4 Ft²/ton/day. On the other hand, the addition of the polyelectrolyte flocculant at a rate of 0.03 lb./ton at a point adjacent the bottom channel of the feedwell within the feedwell produced a unit area capacity of 0.25 Ft²/ton/day. The latter results being comparable to feeding the flocculant to an intermediate channel such as channel 30 at a flocculant dosage rate of 0.035/lb./ton. In effect the utilization of the disclosed feedwell results in an estimated 1.6 times greater tank capacity than where the flocculant is added prior to the feedwell.

It will be apparent from the foregoing description that the present invention has many advantages in use. In addition to the rapid and thorough mixing of flocculants with an influent feed, a sedimentation tank of greater capacity is achieved resulting in a more economical and efficient apparatus.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:

1. A settling tank which comprises in combination, feed supply means for delivering an influent feed suspension to the tank, overflow means for clarified liquor separated from the influent feed, a settled solids collecting zone at the bottom of the tank provided with settled solids discharge means, a movable rake structure for moving settled solids to said discharge means, and a feedwell for receiving the influent feed suspension, said feedwell comprising:
   (a) a vertical hollow column arranged at the center of the tank and open at the bottom thereof to said settled solids collecting zone,
   (b) a cylindrical feedwell located adjacent the top of said column spaced from said settled solids collecting zone and including vertically spaced upper and lower cylindrical channels located about the periphery of said column and open to the longitudinal axis of said column,
   (c) influent feed inlet means for introducing the influent feed to said feedwell and including a feed pipe having branch feed pipes for splitting and tangentially directing like feed streams into said spaced upper and lower channels of said feedwell for rotation in respective clockwise and counterclockwise paths for discharge and remerging inwardly in a transverse zone of shear within an area of said feedwell surrounded and peripherally defined by said upper and lower channels, whereat the energy of the feed streams is converted into random turbulence and the energy of the influent feed is dissipated,
   (d) a flocculant dispersing means provided in said feedwell comprising a third cylindrical channel about the periphery of said column and having a discharge into said feedwell and arranged at a location interposed between said vertically spaced upper and lower channels, a feed inlet to said third channel for dispersing a preselected dosage of diluted flocculant to said channel for discharge therefrom directly into said zone of shear for mixing with said remerged feed stream prior to its discharge from said feedwell.

2. The settling tank of claim 1 wherein solids are settled from said influent feed within said feedwell column to discharge from the open lower end of said column into a settled solids bed and wherein said column is of predetermined length adapted to extend either into or above said bed.

3. The settling tank of claim 1 wherein said channel members comprise flanged tray members secured to the inner walls of said cylindrical column and wherein said influent feed and flocculant feed thereto are directed tangentially into said channels.

* * * * *